Jan. 3, 1939.  L. T. SACHTLEBEN  2,142,378
PHOTOELECTRIC VELOCITY DETECTOR
Filed Dec. 23, 1936
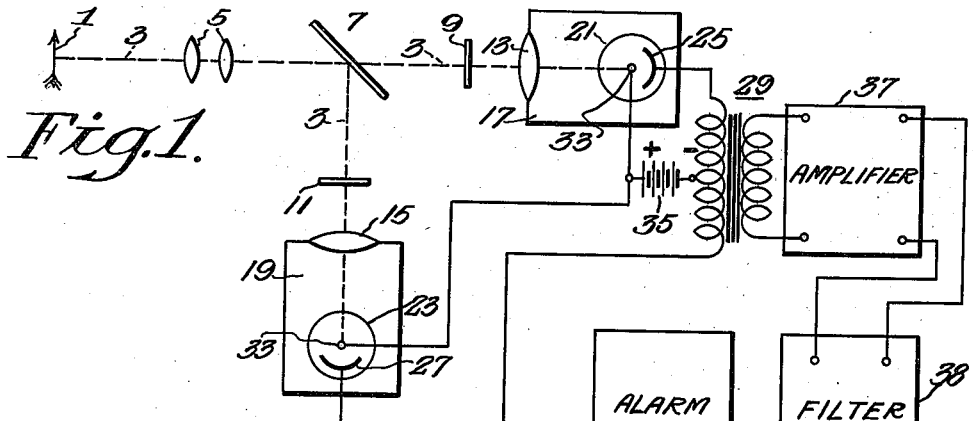
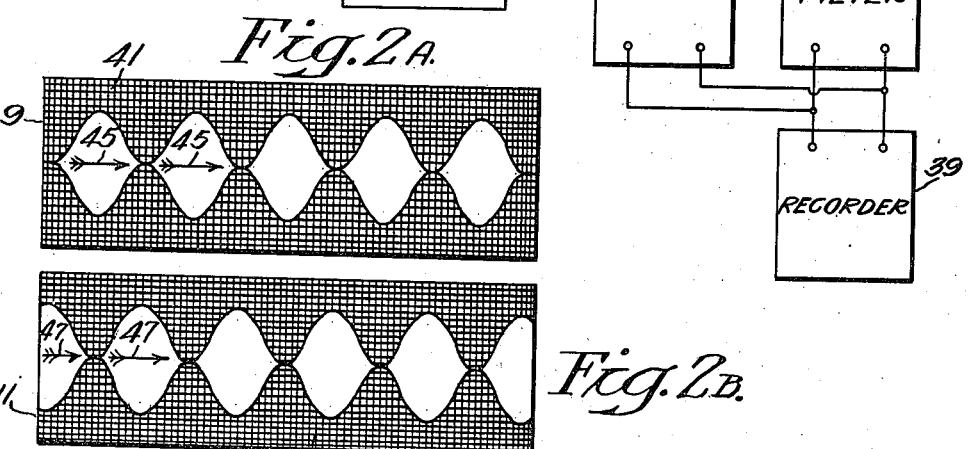
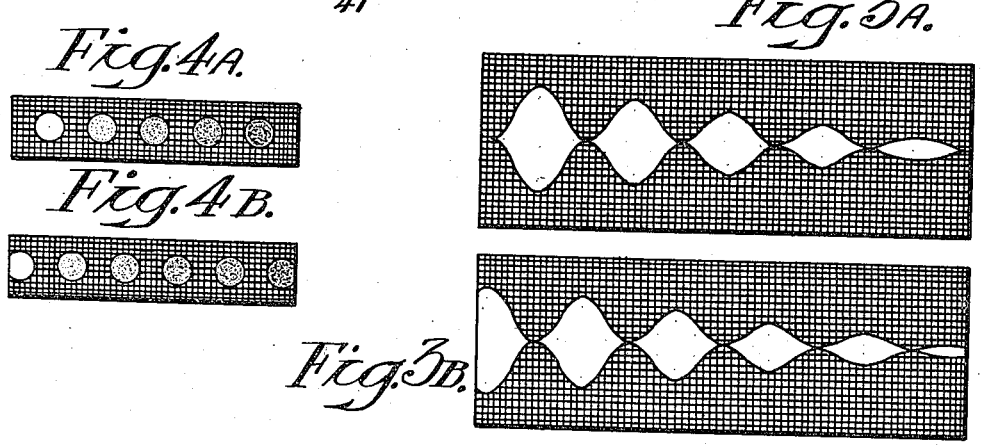
Inventor
Lawrence T. Sachtleben
By
Attorney Patented Jan. 3, 1939

2,142,378

UNITED STATES PATENT OFFICE 2,142,378

PHOTOELECTRIC VELOCITY DETECTOR

Lawrence T. Sachtleben, Camden, N. J., assignor to Radio Corporation of America, a corporation of Delaware Application December 23, 1936, Serial No. 117,296

4 Claims. (Cl. 250—41.5)

My invention relates to velocity detectors and more particularly to a photo-electric means for indicating the velocity of moving bodies and including means for balancing out ordinary changes in light, as distinguished from the light reflected from moving bodies to the photo-electric means.

I am aware of the use of photo-electric devices for detecting the presence of a translucent body. In such installations, a source of light is arranged to shine on a photo-electric tube. If a translucent body is interposed between the light and the photo-electric tube, the tube response is indicated as a change in electric current, which may be amplified to actuate relays, meters, or the like. Since the photo-electric tube has an output current which varies as a function of the light applied to the tube, it should be apparent that normal variations of the light impinging on the tube will affect the output currents along with variation caused by intercepting a particular beam of light.

My invention contemplates applying light to a pair of photo-electric tubes in such a manner that ordinary variations of surrounding light will have substantially no effect upon the combined output currents of the tubes, but light reflected from moving bodies will be indicated as a change in photo-electric output currents.

The principal object of my invention is to provide an improved means for indicating the velocity of moving bodies.

Another object of my invention is to provide means for arranging a pair of photo-electric tubes so that their normal output currents are arranged in opposite phases, while the variation of output current as a function of light reflected from a moving object is in phase.

A further object of my invention is to provide a pair of photo-electric tubes with a pair of light intercepting screens which are arranged in opposite phase, whereby light from a moving body creates in-phase currents, whose frequency varies as a function of the velocity of a moving body.

A further object is to provide means for indicating and recording the velocity of moving bodies, as a function of the frequency of photo-electric currents generated by the interception of light reflected from the moving body.

My invention may be best understood by reference to the accompanying drawing in which Figure 1 is a schematic circuit arrangement of one embodiment of my invention, Figures 2A and 2B are elevational views of one embodiment of the light-intercepting screens employed in Fig. 1, and Figures 3A, 3B, 4A and 4B are elevational views indicating modified forms of screens.

Referring to Fig. 1, a moving body is indicated by the arrow 1. Light reflected from any suitable source is reflected from the arrow and traverses a path 3 indicated by dash lines 3. This light passes through objective lens 5 to create images on the screens 9 and 11. The mirror 7 is half silvered, so that half of the light goes through the mirror and half of the light is reflected from the mirror, as indicated by the dash lines 3. The two screens 9 and 11 are interposed between the mirror 7 and condensing lenses 13, 15, which are held within suitable housings 17, 19, and preferably arranged to focus images of the objective lens 5 on the sensitive surface of photo-electric tubes 21, 23. These housings also support these photo-electric tubes 21, 23.

The electrodes of the photo-electric tubes are connected as follows: The plate electrodes 25, 27 are connected to the primary terminals of a transformer 29. The remaining electrodes 31, 33 are connected together and to the positive terminal of a battery 35. The negative terminal of this battery is connected to the center-tap of the primary of the transformer 29. The secondary of the transformer 29 is connected to a suitable amplifier 37, whose output may be applied, through a filter 38, to a recorder or any suitable type of frequency-indicating meter 39.

The screens 9, 11 are preferably made with an opaque portion 41 and a transparent portion 43. The transparent portion preferably has a sinusoidal form. The transparent openings 43 are preferably arranged 180° out of phase with respect to each other. This out of phase arrangement allows one of the screens to admit the maximum amount of light to its associated photo-electric tube when the other of said screens admits a minimum amount of light to its associated photo-electric tube.

The operation of the foregoing device is essentially as follows: Normal variations of surrounding light, such as the variations between the maximum amount of sunlight and nightfall, affect each of the photo-electric tubes equally. Such equal variation of current is cancelled out in the primary winding of the transformer 29 and, therefore, has no effect on the recorder 39. If an object, such as the arrow 1, is moving across the field of the objective lens 5, its image will move on the screens 9 and 11, being divided into two identical images by the mirror 7. As the image of the arrow moves across the intercepting screens in the direction indicated by arrows 45, 47, variable amounts of light will be imposed on the photo-electric tubes. This variation is at a maximum in tube 21 at the same time that it is at a minimum with respect to tube 23. These opposing effects establish currents which add up in the transformer primary 29 and are further amplified and finally recorded on the meter 39. Since the rate of change of photo-electric currents depends solely on the rate at which the image of the moving object is intercepted by the screen openings, the output frequency will be a direct function of the velocity of the moving body. The filter 38 may be adjusted to pass frequencies above or below desired limits, or may be omitted from the circuit.

It should be understood that my invention may be applied to devices for recording the velocity of moving automobiles, airplanes, trains, pedestrians, and the like. For example, my invention may be placed above a highway, so that vehicles passing under the lens 5 would operate the recorder to either visibly indicate the frequency of the photo-electric currents, actuate an alarm at velocities exceeding predetermined limits, or record on a moving tape suitable symbols which could be transcribed in terms of velocity.

I do not limit my invention to any particular type of meter or recorder. It should be understood that suitable types of frequency meters and suitable types of recorders are commercially available. While I prefer to use screens with sinusoidal light admitting portions, my invention is not limited to any particular screen opening. The screen openings may be made successively smaller or arranged to admit successively smaller amounts of light, as shown respectively in Figs. 3A, 3B and Figs. 4A, 4B, to vary the amplitude, as well as the frequency, of the photo-electric currents and thereby indicate the direction of movement and the velocity of a moving body. Likewise, while a 180° relationship is specified between the screen openings, other angular displacements may be used.

I claim as my invention:

1. The method of indicating the velocity of a moving body which comprises dividing light from said body into two paths, alternately passing light in first one and then the other of said paths, gradually reducing the amount of light passing along a portion of said paths, creating electric currents by the light alternately passing said paths, said currents diminishing as a function of said gradual reduction of light, and indicating the frequency of said currents and the diminution of said currents whereby the velocity of said moving body and its direction of motion may be determined.

2. In a device for indicating the velocity and direction of a moving object, means for obtaining a plurality of light images of said object, light responsive devices each positioned to respond to one of said light images, a plurality of screens including a plurality of apertures, one screen positioned between each of said light images and its respective light responsive device for alternately transmitting and rejecting said light images as they move across said screen; said apertures being of variable area and constant length along a line parallel to the movement of said image, whereby the motion of said body causes said light image falling upon said light sensitive device through said screen to be interrupted by said screen to produce output currents whose changing amplitude is a measure of the direction of said motion, and whose frequency is proportional to the speed of said object.

3. In a device for indicating the direction and velocity of a moving object, means for producing a plurality of similar images of said object, a separate opaque screen for receiving each of said images, each screen including a plurality of transparent apertures, said apertures being of varying area and constant length, said screens being so positioned that when said image falls on an aperture of one screen the corresponding image falls upon an opaque portion of the other screen, a photoelectric device arranged to receive the light transmitted through each screen, whereby the frequency of the output currents of said devices indicates the speed of said object and the change in the amplitude of said currents indicates its direction of travel.

4. In a device for indicating the direction and velocity of a moving object, means for producing a plurality of similar images of said object, a separate opaque screen for receiving each of said images, each screen including a plurality of apertures of uniform area and varying degree of transparency, said screens being so positioned that when said image falls on an aperture of one screen the corresponding image falls upon an opaque portion of the other screen, a photoelectric device arranged to receive the light transmitted through each screen, whereby the frequency of the output currents of said devices indicates the speed of said object and the change in the amplitude of said currents indicates its direction of travel.

LAWRENCE T. SACHTLEBEN.